(12) United States Patent
Chen (10) Patent No.: US 8,261,942 B2
(45) Date of Patent: Sep. 11, 2012

(54) LIQUID DISPENSER

(75) Inventor: Cheng-Chang Chen, Taipei Hsien (TW)

(73) Assignee: Bobson Hygiene International Inc., Taipei Hsien (TW)

( * ) Notice: Subject to any disclaimer, the term of this patent is extended or adjusted under 35 U.S.C. 154(b) by 939 days.

(21) Appl. No.: 12/271,405

(22) Filed: Nov. 14, 2008

(65) Prior Publication Data

US 2010/0051640 A1   Mar. 4, 2010

(30) Foreign Application Priority Data

Sep. 3, 2008 (TW) ............................... 97215858 U (51) Int. Cl.
*B67D 1/00* (2006.01)

(52) U.S. Cl. .... 222/63; 340/691.7; 700/282; 222/181.3; 222/333

(58) Field of Classification Search .................... 222/52, 222/63, 181.3, 263, 321.9, 333, 504, 509, 222/575, 321.7; 4/628; 141/98; 700/282; 340/691.7

See application file for complete search history.

(56) References Cited

U.S. PATENT DOCUMENTS

| | | | | |
|---|---|---|---|---|
| 4,772,372 A | * | 9/1988 | Bruns et al. | 204/224 M |
| 5,275,309 A | * | 1/1994 | Baron et al. | 222/129.1 |
| 5,492,247 A | * | 2/1996 | Shu et al. | 222/63 |
| 6,206,238 B1 | * | 3/2001 | Ophardt | 222/1 |
| 6,536,629 B2 | | 3/2003 | van der Heijden | |
| 7,191,920 B2 | * | 3/2007 | Boll et al. | 222/333 |
| 2003/0075565 A1 | * | 4/2003 | Gerenraich et al. | 222/207 |
| 2005/0087552 A1 | * | 4/2005 | Ciavarella et al. | 222/181.1 |
| 2005/0139617 A1 | * | 6/2005 | Lewis | 222/333 |
| 2005/0247735 A1 | * | 11/2005 | Muderlak et al. | 222/190 |

* cited by examiner

*Primary Examiner* — Kevin P Shaver
*Assistant Examiner* — Andrew P Bainbridge
(74) *Attorney, Agent, or Firm* — McNees Wallace & Nurick LLC (57) ABSTRACT

A liquid dispenser has a liquid filled container which is attached to a pump for dispensing. The pump has at least two sensors, a first sensor that identifies whether a person's hand is present and activates the pump, and a second sensor that identifies when the pump has been fully actuated which then switches the direction of the pump's actuation back to its starting point. The dispensing nozzle serves as the pump's actuator and is moved by a motor powered gear system and a toothed rack to move the nozzle.

7 Claims, 7 Drawing Sheets

LIQUID DISPENSER

CROSS-REFERENCE TO RELATED APPLICATION

This application claims priority of Taiwanese Application No. 097215858, filed on Sep. 3, 2008.

BACKGROUND OF THE INVENTION

1. Field of the Invention

The present invention relates to a liquid dispenser, more particularly to a liquid dispenser including a part-driving unit that has a gear set and a rack driven by the gear set to drive movement of a liquid-driving unit for discharging an amount of a liquid from a liquid container.

2. Description of the Related Art

Figure 1:
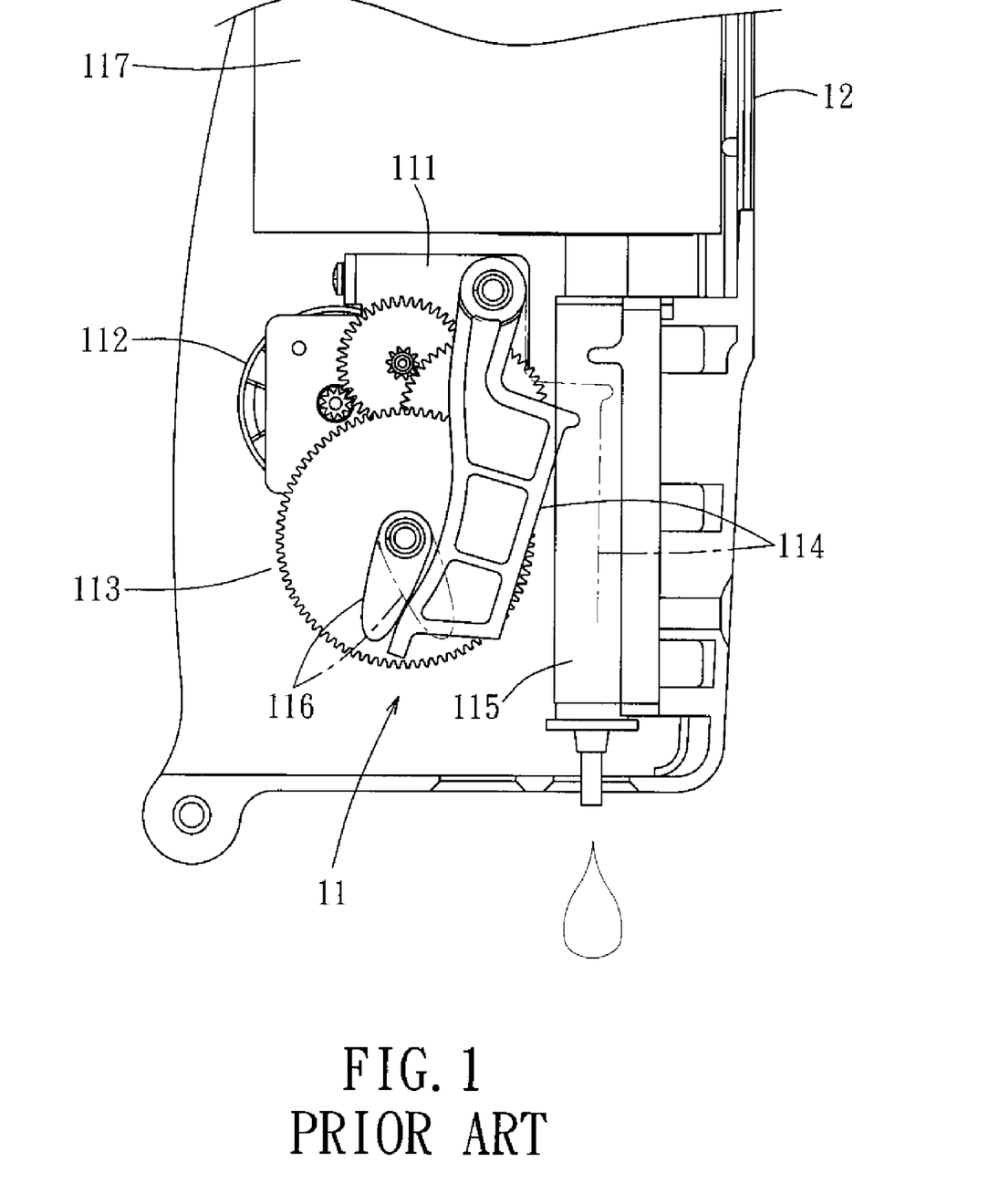
FIG. 1 is a fragmentary schematic view of a conventional liquid dispenser.

As shown in FIG. 1, Taiwanese Patent Utility Model No. M328853 discloses a conventional liquid soap dispenser including an automatic liquid discharging mechanism 11 mounted in a housing 12. The automatic liquid discharging mechanism 11 includes a base 111, a motor 112 mounted on the base 111, a gear set 113 mounted on the base 111 and driven by the motor 112, a pressing member 114 connected pivotably to the base 111, a liquid container 117 receiving a liquid soap therein, and an elastic deformable conduit 115 connected to and in liquid communication with the liquid container 117. A pushing member 116 is driven by the gear set 113 and is in contact with the pressing member 114 such that when the motor 112 is actuated, the gear set 113 drives the pushing member 116 to rotate, which, in turn, results in pivoting of the pressing member 114 to a position to squeeze the deformable conduit 115, thereby discharging the liquid soap from an outlet of the deformable conduit 115. The pushing member 116 and the pressing member 114 subsequently return to their original positions and the deformable conduit 115 returns to its original shape after discharging. The deformable conduit 115 is likely to suffer from material fatigue after a period of use due to repeated deformation.

U.S. Pat. No. 6,536,629 discloses an aerosol device including a liquid pump that defines a passage therein and that has a plunger extending into the passage and an actuating head connected to the plunger for driving movement of the plunger between closed and opened positions. The passage has an inlet adapted to be in liquid communication with a liquid container, and an outlet opposite to the liquid inlet. The actuating head is pressable such that when the actuating head is pressed by the user, the plunger is driven to move from the closed position to the opened position for drawing a liquid from the liquid container to pass through the inlet and outlet of the passage.

SUMMARY OF THE INVENTION

An object of the present invention is to provide a liquid dispenser that includes a part-driving unit which can be applied to different types of conventional liquid-driving units for discharging a constant amount of a liquid from a liquid container.

Accordingly, a liquid dispenser of the present invention comprises: a liquid container defining a liquid-storing space that is adapted to store a liquid therein; a liquid-driving unit defining a liquid passage and having a movable part, the liquid passage having an inlet that is in liquid communication with the liquid-storing space, and an outlet that is disposed outwardly of the liquid container, the movable part being movable between first and second positions for driving an amount of the liquid from the liquid-storing space to pass through the inlet and the outlet; and a part-driving unit including a power-driven gear set, and a rack engaging and driven by the gear set and connected to the movable part for driving movement of the movable part between the first and second positions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
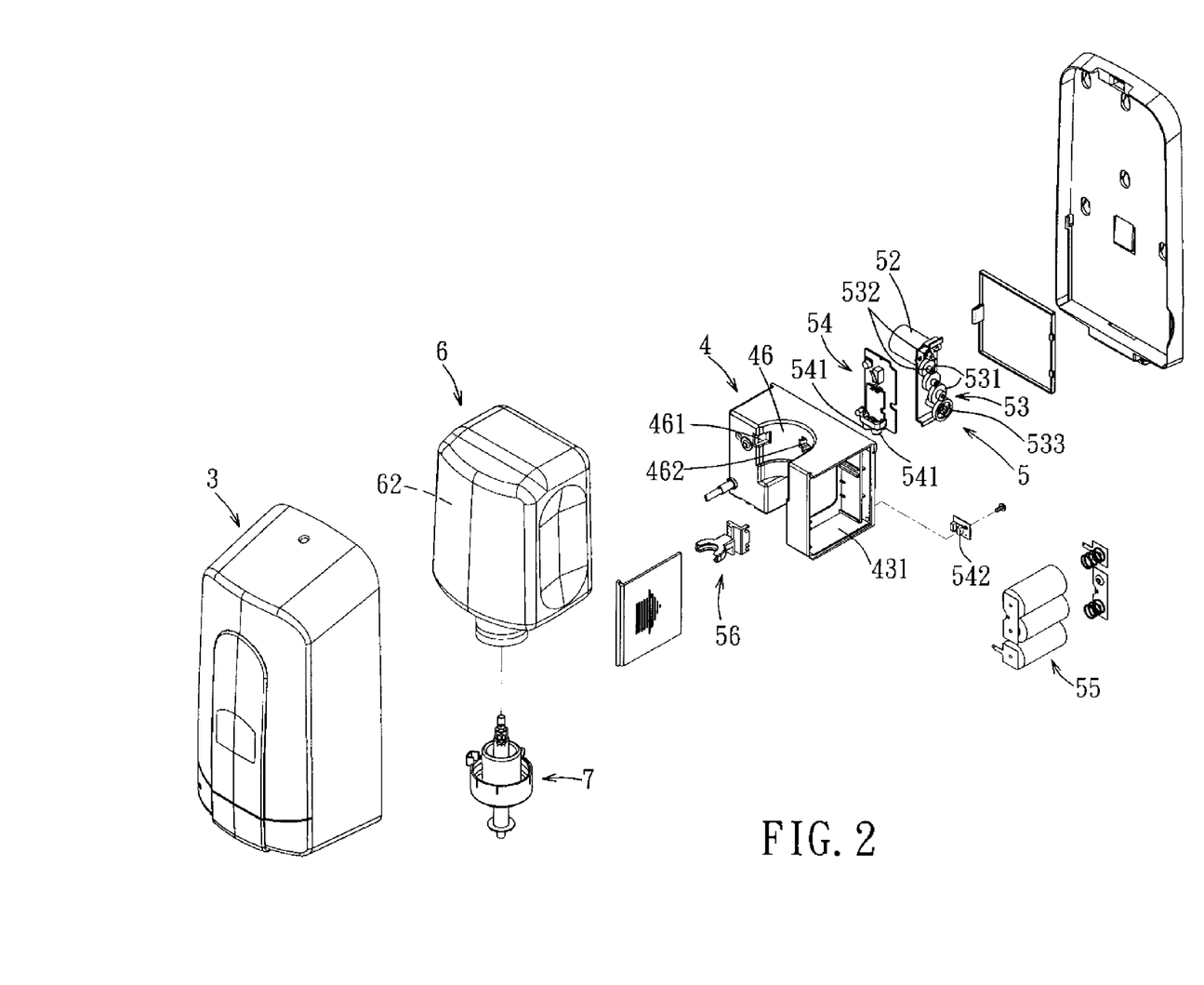
FIG. 2 is an exploded perspective view of the preferred embodiment of a liquid dispenser according to the present invention.
Figure 3:
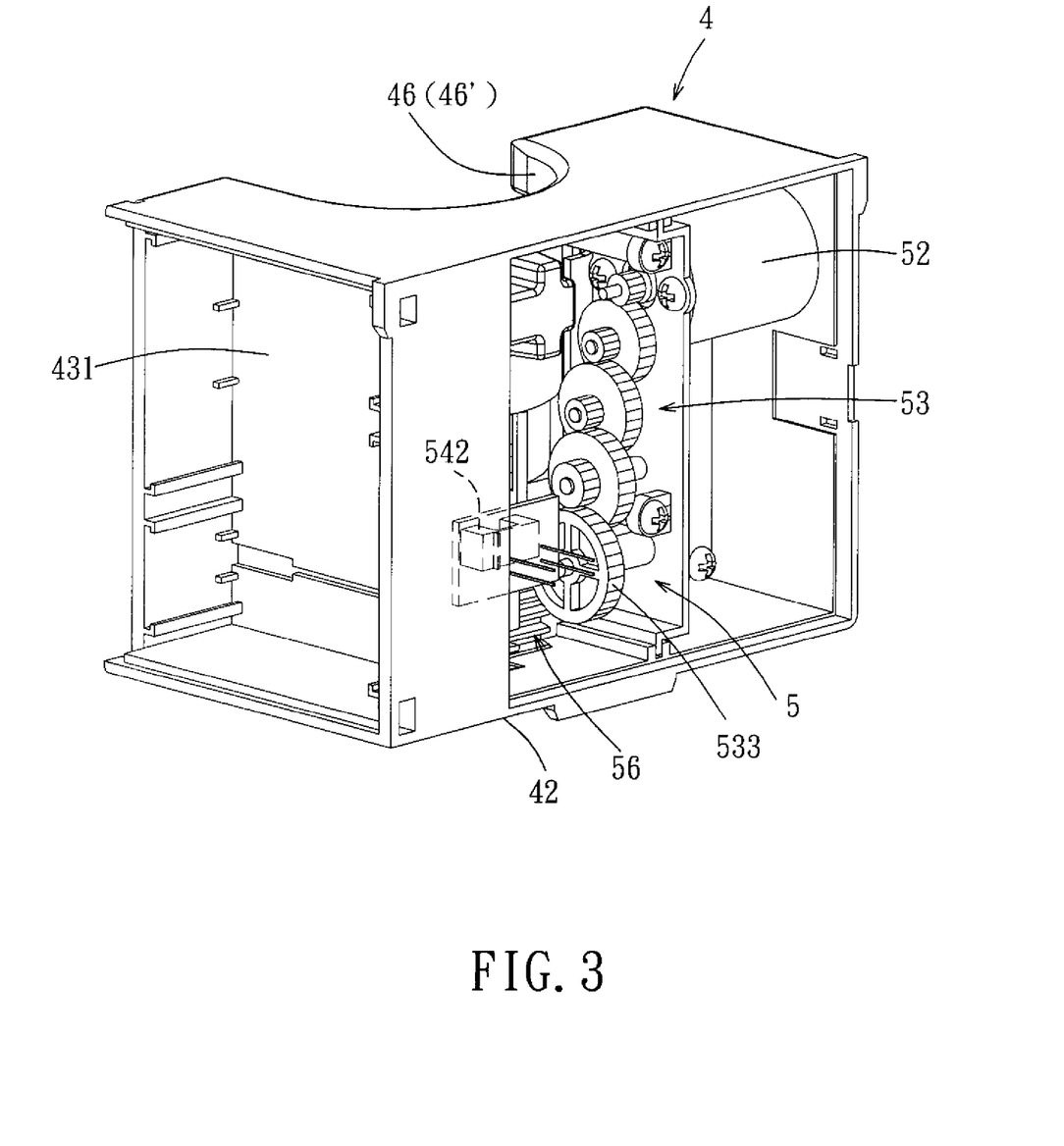
FIG. 3 is a perspective view to illustrate the configuration of a part-driving unit and a position of a sensor of the preferred embodiment.
Figure 4:
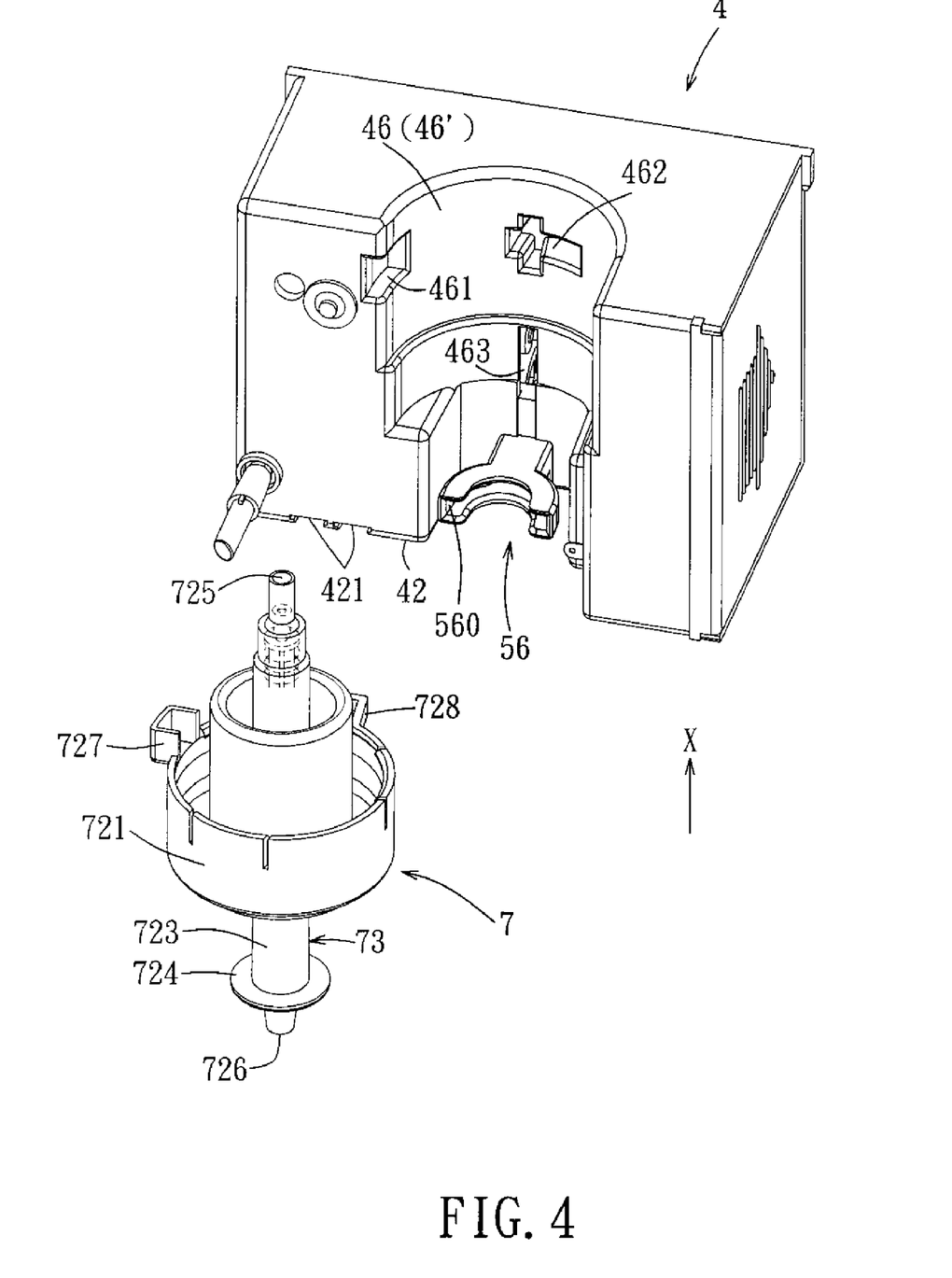
FIG. 4 is an exploded perspective view to illustrate the configuration of a liquid-driving unit and a mounting casing of the preferred embodiment.
Figure 6:
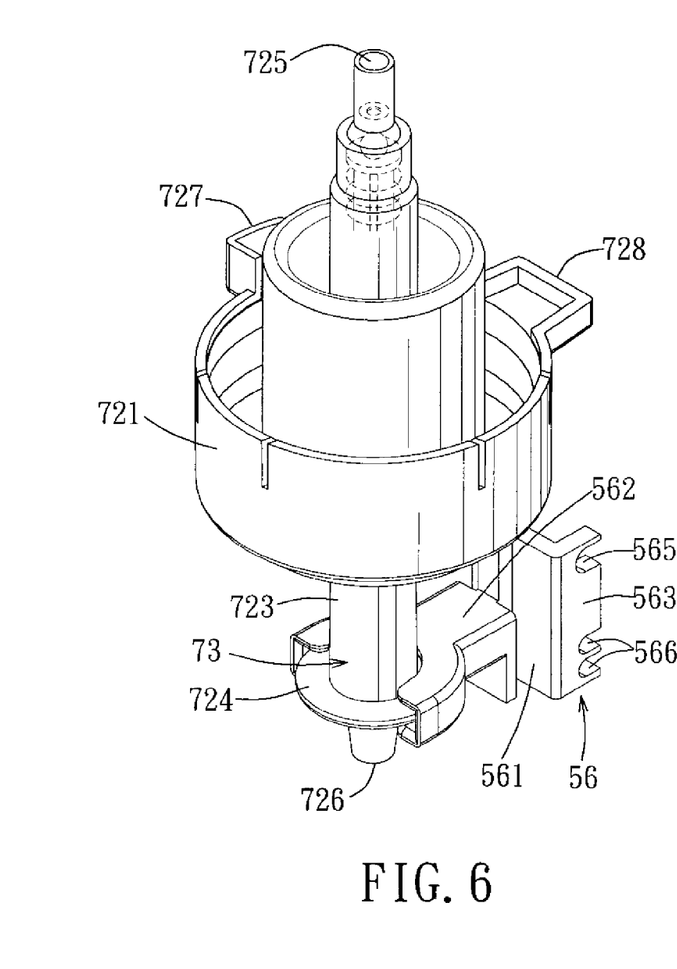
FIG. 6 is an assembled perspective view to illustrate the configuration of the rack and the liquid-driving unit of the preferred embodiment.

Referring to FIGS. 2 to 4, the preferred embodiment of a liquid dispenser according to the present invention is shown to include: a liquid container 6 defining a liquid-storing space 62 that is adapted to store a liquid 8, such as a cleaning liquid, therein; a liquid-driving unit 7 (see FIGS. 6 and 7) defining a liquid passage 70 and having a movable part 73, the liquid passage 70 having an inlet 725 that is in liquid communication with the liquid-storing space 62, and an outlet 726 that is disposed outwardly of the liquid container 6, the movable part 73 being movable between first and second positions (see FIGS. 7 and 8) for driving an amount of the liquid 8 from the liquid-storing space 62 to pass through the inlet 725 and the outlet 726; and a part-driving unit 5 including a power-driven gear set 53, and a rack 56 engaging and driven by the gear set 53 and connected to the movable part 73 for driving movement of the movable part 73 between the first and second positions.

Figure 5:
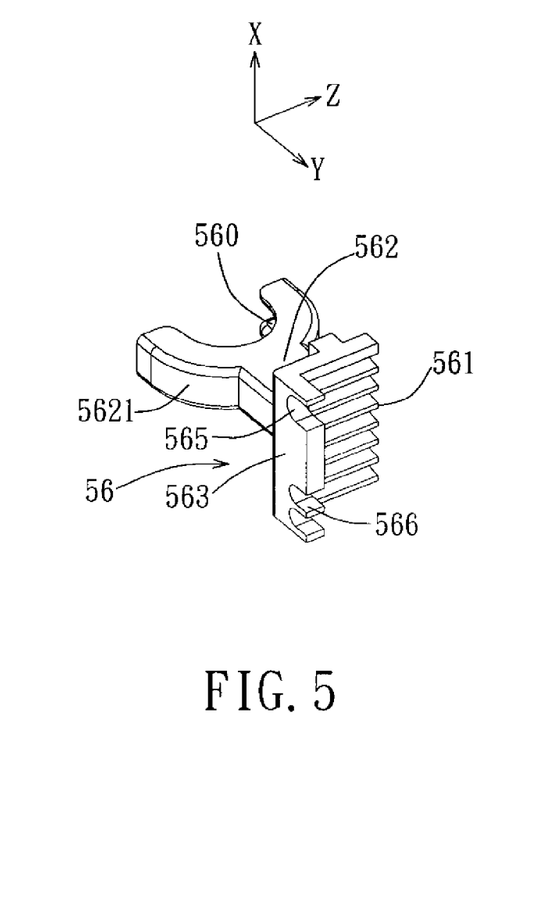
FIG. 5 is an exploded perspective view to illustrate the configuration of a rack of the preferred embodiment.
Figure 7:
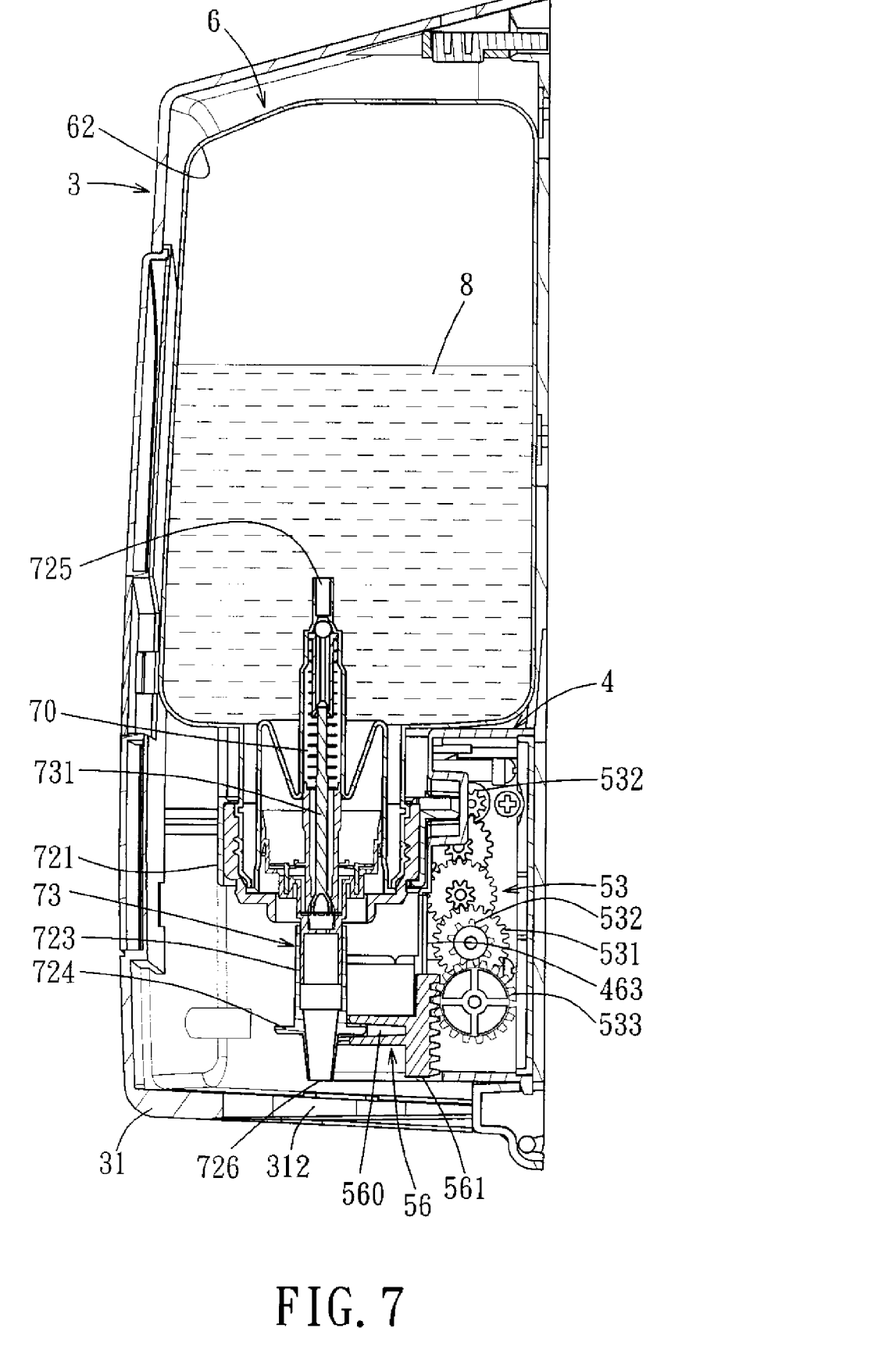
FIG. 7 is an assembled sectional view to illustrate a state where the rack together with a plunger of the preferred embodiment is disposed at a first position.
Figure 8:
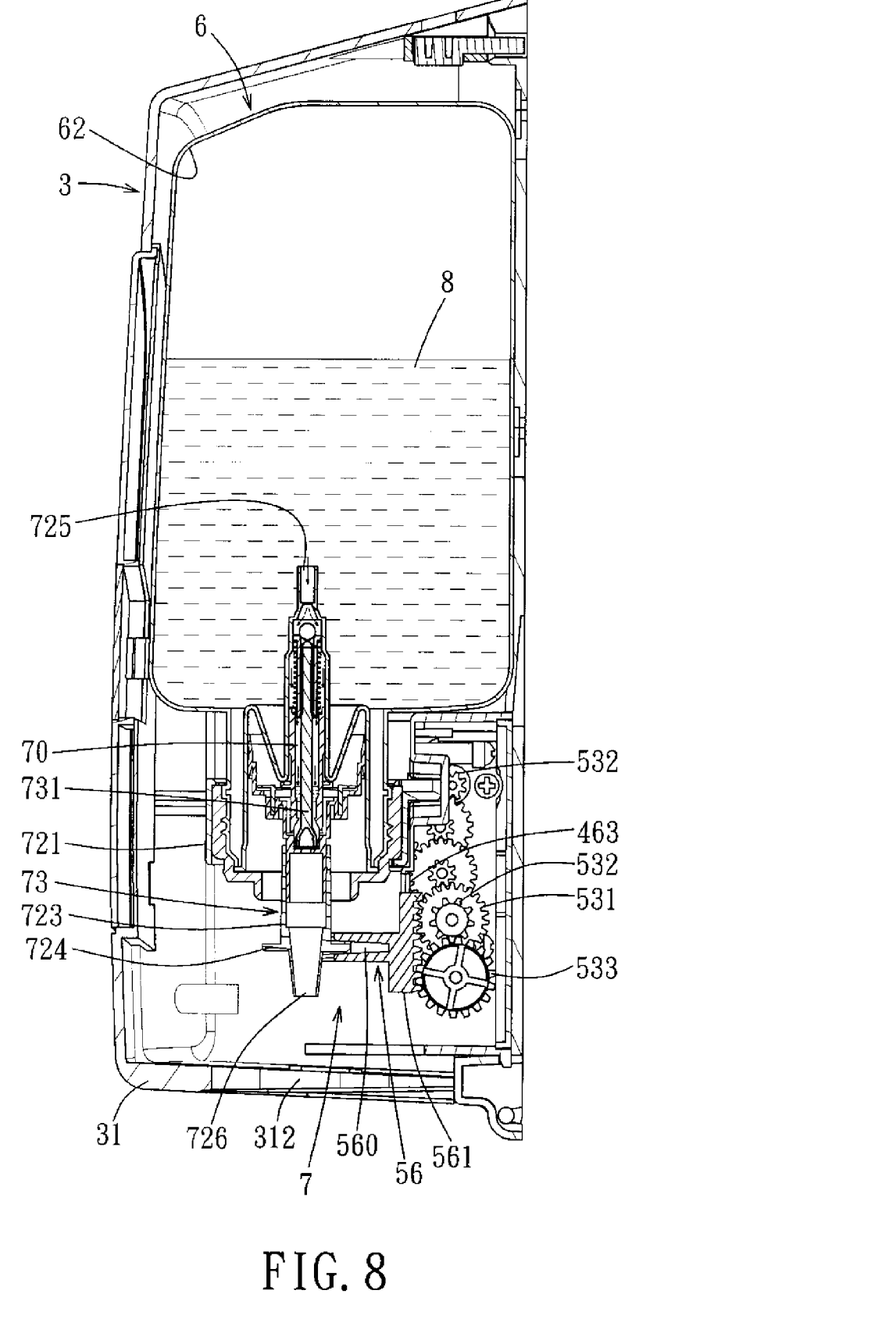
FIG. 8 is an assembled sectional view to illustrate another state where the rack together with the plunger of the preferred embodiment is disposed at a second position.

In this embodiment, the gear set 53 includes a pinion 533 (see FIGS. 2, 3 and 7). The rack 56 has a toothed plate 561 (see FIG. 5) that engages the pinion 533, and a holding arm 562 that extends from the toothed plate 561 and that defines a retaining recess 560. The movable part 73 includes a coupling sleeve 723 that extends in a first direction (X), and a flange 724 that radiates outwardly from the coupling sleeve 723 into the retaining recess 560 (see FIG. 6). The holding arm 562 has an enlarged C-shaped end 5621 that defines the retaining recess 560.

In this embodiment, the liquid dispenser further includes a mounting casing 4, a motor 52 mounted on the mounting casing 4, a control circuit 54 coupled to the motor 52 for controlling operation of the control circuit 54 to control activation of the motor 52, and a pair of first sensors 541 mounted on the mounting casing 4 and coupled to the control circuit 54 for controlling circuit states of the motor 52.

Each of the first sensors 541 is a light sensor. The mounting casing 4 has a bottom wall 42 (see FIG. 4) that is formed with a pair of through-holes 421. The first sensors 541 are respectively aligned with the through-holes 421 in the first direction (X).

In this embodiment, the liquid dispenser further includes a second sensor 542 mounted on the mounting casing 4 (see FIG. 3) and coupled to the control circuit 54 for controlling operating of the control circuit 54 to control direction of rotation of the motor 52.

The second sensor 542 is a light sensor. The movable part 73 is movable together with the rack 56 in the first direction (X) between the first and second positions. The rack 56 further has a light-blocking plate 563 (see FIG. 5) that extends from an end of the toothed plate 561 in a transverse direction (Y) relative to the toothed plate 561 and that is formed with upper and lower holes 565, 566 which are aligned in the first direction (X). The second sensor 542 is aligned with the upper hole 565 in a second direction (Z) transverse to the first direction (X) when the movable part 73 is disposed at the first position, and is aligned with the lower hole 566 in the second direction (Z) when the movable part 73 is disposed at the second position.

The movable part 73 further includes a plunger 731 extending in the first direction (X) into the liquid passage 70. The coupling sleeve 723 is coupled to and is sleeved around the plunger 731. The liquid-driving unit 7 further has an annular outer surrounding wall 721 sleeved around and coupled to the coupling sleeve 723. The movable part 73 is movable relative to the outer surrounding wall 721 in the first direction (X). The outer surrounding wall 721 is formed with first and second inserting protrusions 727, 728 (see FIG. 6). The mounting casing 4 defines an accommodating recess 46 defined by a recess-defining wall 46' that is formed with first and second retaining holes 461, 462. The outer surrounding wall 721 and the coupling sleeve 723 are received in the accommodating recess 46. The first and second inserting protrusions 727, 728 of the outer surrounding wall 721 extend fittingly into the first and second retaining holes 461, 462, respectively.

In this embodiment, the recess-defining wall 46' is further formed with an elongate guiding slot 463 that extends in the first direction (X). The holding arm 562 of the rack 56 extends from the toothed plate 561 through the elongate guiding slot 463 such that the enlarged C-shaped end 5621 is disposed in the accommodating recess 46.

In this embodiment, the liquid dispenser further includes a housing 3. The liquid container 6, the liquid-driving unit 7, and the part-driving unit 5 are mounted in the housing 3. The housing 3 has a bottom wall 31 that is formed with a bottom opening 312 registered with the outlet 726 of the liquid passage 70 for passage of the liquid 8 therethrough. The bottom wall 31 of the housing 3 is further formed with a sensor-detecting opening (not shown) registered with the through-holes 421 in the bottom wall 42 of the mounting casing 4.

Referring to FIG. 2, a battery unit 55 is mounted in a chamber 431 in the mounting casing 4. The gear set 53 further includes a reduction gear unit driven by the motor 52, engaging the pinion 533, and having a plurality of transmission gears 531 and reduction gears 532 for reducing the speed to be transmitted to the rack 56.

In this embodiment, the liquid driving unit 7 is a pump having a structure similar to that of the liquid pump disclosed in U.S. Pat. No. 6,536,629. Details of the structure and operation of the pump can be found in the aforesaid patent.

In operation, when the hand of the user is placed at a position underneath the through-holes 421 in the bottom wall 42 of the mounting casing 4, the first sensors 541 detect the hand of the user and enable the control circuit 54 to actuate the motor 52 to rotate in a first rotational direction (note that the second sensor 542 is aligned with the upper hole 565 in the light-blocking plate 563 in the second direction (Z) at this time), which results in rotation of the gear set 53 and movement of the movable part 73 together with the rack 56 in the first direction (X) from the first position to the second position. When the movable part 73 reaches the second position, the second sensor 542 is aligned with the lower hole 566 in the light-blocking plate 563 and enables the motor 52 to rotate in a second rotational direction opposite to the first rotational direction until the movable part 73 reaches the first position.

With the inclusion of the rack 56 in the part-driving unit 5 of the liquid dispenser of this invention, the liquid dispenser can be applied to different types of the liquid-driving units. Moreover, combination of the part-driving unit 5, the liquid-driving unit 7 having the plunger 731 as driving means, the second sensor 542, and the upper and lower holes 565, 566 in the light-blocking plate 563 permits a regulated amount of the liquid 8 to be discharged from the liquid container 6 during every dispensing operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A liquid dispenser comprising:
   a liquid container defining a liquid-storing space that is adapted to store a liquid therein;
   a liquid-driving unit defining a liquid passage and having a movable part, said liquid passage having an inlet that is in liquid communication with said liquid-storing space, and an outlet that is disposed outwardly of said liquid container, said movable part being movable between first and second positions for driving an amount of the liquid from the liquid-storing space to pass through said inlet and said outlet; and
   a part-driving unit including a power-driven gear set, and a rack engaging and driven by said gear set and connected to said movable part for driving movement of said movable part between the first and second positions;
   a mounting casing;
   a motor mounted on said mounting casing;
   a control circuit coupled to said motor for controlling operation of said motor;
   a first sensor mounted on said mounting casing and coupled to said control circuit for controlling operation of said control circuit to control activation of said motor;
   a second sensor mounted on said mounting casing and coupled to said control circuit for controlling operation of said control circuit to control direction of rotation of said motor; and
   wherein said second sensor is a light sensor, said gear set including a pinion, said movable part being movable together with said rack in a first direction between the first and second positions, said rack having a toothed plate that engages said pinion, and a light-blocking plate that extends from an end of said toothed plate in a transverse direction relative to said toothed plate and that is formed with upper and lower holes which are aligned in the first direction, said second sensor being aligned with said upper hole in a second direction transverse to the first direction when said movable part is disposed at the first position, and being aligned with said lower hole in the second direction when said movable part is disposed at the second position.

2. The liquid dispenser as claimed in claim 1, wherein said rack has a holding arm that extends from said toothed plate and that defines a retaining recess, said movable part including a coupling sleeve that extends in a first direction, and a flange that radiates outwardly from said coupling sleeve into said retaining recess.

3. The liquid dispenser as claimed in claim 2, wherein said holding arm has an enlarged C-shaped end that defines said retaining recess.

4. The liquid dispenser as claimed in claim 1, wherein said mounting casing has a bottom wall that is formed with a through-hole, said first sensor being aligned with said through-hole in a direction.

5. The liquid dispenser as claimed in claim 1, wherein said movable part includes a plunger extending in a first direction, a coupling sleeve coupled to and sleeved around said plunger, and a flange radiating outwardly from said coupling sleeve and connected to said rack, said liquid-driving unit further having an annular outer surrounding wall sleeved around said coupling sleeve, said movable part being movable relative to said outer surrounding wall in the first direction, said outer surrounding wall being formed with an inserting protrusion, said mounting casing defining an accommodating recess defined by a recess-defining wall that is formed with at least a retaining hole, said outer surrounding wall and said coupling sleeve being received in said accommodating recess, said inserting protrusion of said outer surrounding wall extending into said retaining hole.

6. The liquid dispenser as claimed in claim 5, wherein said recess-defining wall is further formed with an elongate guiding slot that extends in the first direction, said gear set including a pinion, said rack having a toothed plate that engages said pinion, and a holding arm that extends from said toothed plate through said elongate guiding slot, and that has an enlarged C-shaped end disposed in said accommodating recess and defining a retaining recess, said flange extending into said retaining recess.

7. The liquid dispenser as claimed in claim 1, further comprising a housing, said liquid container, said liquid-driving unit, and said part-driving unit being mounted in said housing, said housing having a bottom wall that is formed with a bottom opening registered with said outlet of said liquid-driving unit for passage of the liquid therethrough.

* * * * *